US010002073B2

(12) United States Patent
Cai et al.

(10) Patent No.: US 10,002,073 B2
(45) Date of Patent: Jun. 19, 2018

(54) SELECTIVE DATA RECYCLING IN NON-VOLATILE MEMORY

(71) Applicant: SK Hynix Inc., Gyeonggi-do (KR)

(72) Inventors: Yu Cai, San Jose, CA (US); Fan Zhang, Fremont, CA (US); Haibo Li, Cupertino, CA (US); June Lee, Sunnyvale, CA (US)

(73) Assignee: SK Hynix Inc., Gyeonggi-do (KR)

( * ) Notice: Subject to any disclaimer, the term of this patent is extended or adjusted under 35 U.S.C. 154(b) by 54 days.

(21) Appl. No.: 15/148,731

(22) Filed: May 6, 2016

(65) Prior Publication Data

US 2017/0132125 A1 May 11, 2017

Related U.S. Application Data

(60) Provisional application No. 62/252,140, filed on Nov. 6, 2015.

(51) Int. Cl.
*G06F 12/02* (2006.01)
*G06F 3/06* (2006.01)
*G06F 11/10* (2006.01)

(52) U.S. Cl.
CPC .......... *G06F 12/0246* (2013.01); *G06F 3/061* (2013.01); *G06F 3/064* (2013.01); *G06F 3/0679* (2013.01); *G06F 11/10* (2013.01); *G06F 12/0261* (2013.01); *G06F 2212/1016* (2013.01); *G06F 2212/1024* (2013.01); *G06F 2212/1036* (2013.01); *G06F 2212/2022* (2013.01); *G06F 2212/7205* (2013.01); *G06F 2212/7211* (2013.01)

(58) Field of Classification Search
CPC .. G06F 12/0246; G06F 12/0261; G06F 3/061; G06F 3/064; G06F 3/0679
USPC .................................................. 711/103, 163
See application file for complete search history.

(56) References Cited

U.S. PATENT DOCUMENTS

2007/0201274 A1* 8/2007 Yu ....................... G11C 11/5621
365/185.09
2015/0348649 A1 12/2015 Yang
2015/0370701 A1* 12/2015 Higgins .............. G06F 12/0253
711/103

(Continued)

FOREIGN PATENT DOCUMENTS

WO WO-2010078540 A2 * 7/2010 ......... G06F 12/0246

OTHER PUBLICATIONS

Yu Cai et al., Titled, "Flash Correct-and-Refresh: Retention-Aware Error Management for Increased Flash Memory Lifetime." Published in Computer Design (ICCD), 2012 IEEE 30th International Conference on Sep. 30, 2012-Oct. 3, 2012, 8 pages.

(Continued)

*Primary Examiner* — Pierre Miche Bataille
(74) *Attorney, Agent, or Firm* — Kilpatrick Townsend & Stockton LLP

(57) ABSTRACT

Embodiments are directed to methods of classifying a flash memory block of N-level cells into sub-blocks. The N-level cells can store N bits of data. In some embodiments, the sub-blocks can represent one bit of each of the N-level cells. The sub-blocks can be selectively reclaimed in error-correction processes such as read disturb reclaim and retention refresh. Methods described can offer the advantage of reducing write amplification.

21 Claims, 13 Drawing Sheets

(56) References Cited

U.S. PATENT DOCUMENTS

2016/0141042 A1* 5/2016 Peterson ............... G11C 16/26
365/185.11

OTHER PUBLICATIONS

Yu Cai et al., Titled, "Error Patterns in MLC NAND Flash Memory:Measurement, Characterization, and Analysis." Published in Proceedings of the Conference on Design, Automation and Test in Europe Conference & Exhibition on Mar. 12, 2012-Mar. 16, 2012, 6 pages.

Yu Cai et al., Titled, "Read Disturb Errors in MLC NAND Flash Memory:Characterization, Mitigation, and Recover." Published, Published in 2015 45th Annual IEEE/IFIP International Conference on Dependable Systems and Networks on Jun. 22, 2015-Jun. 25, 2015, 12 pages.

* cited by examiner

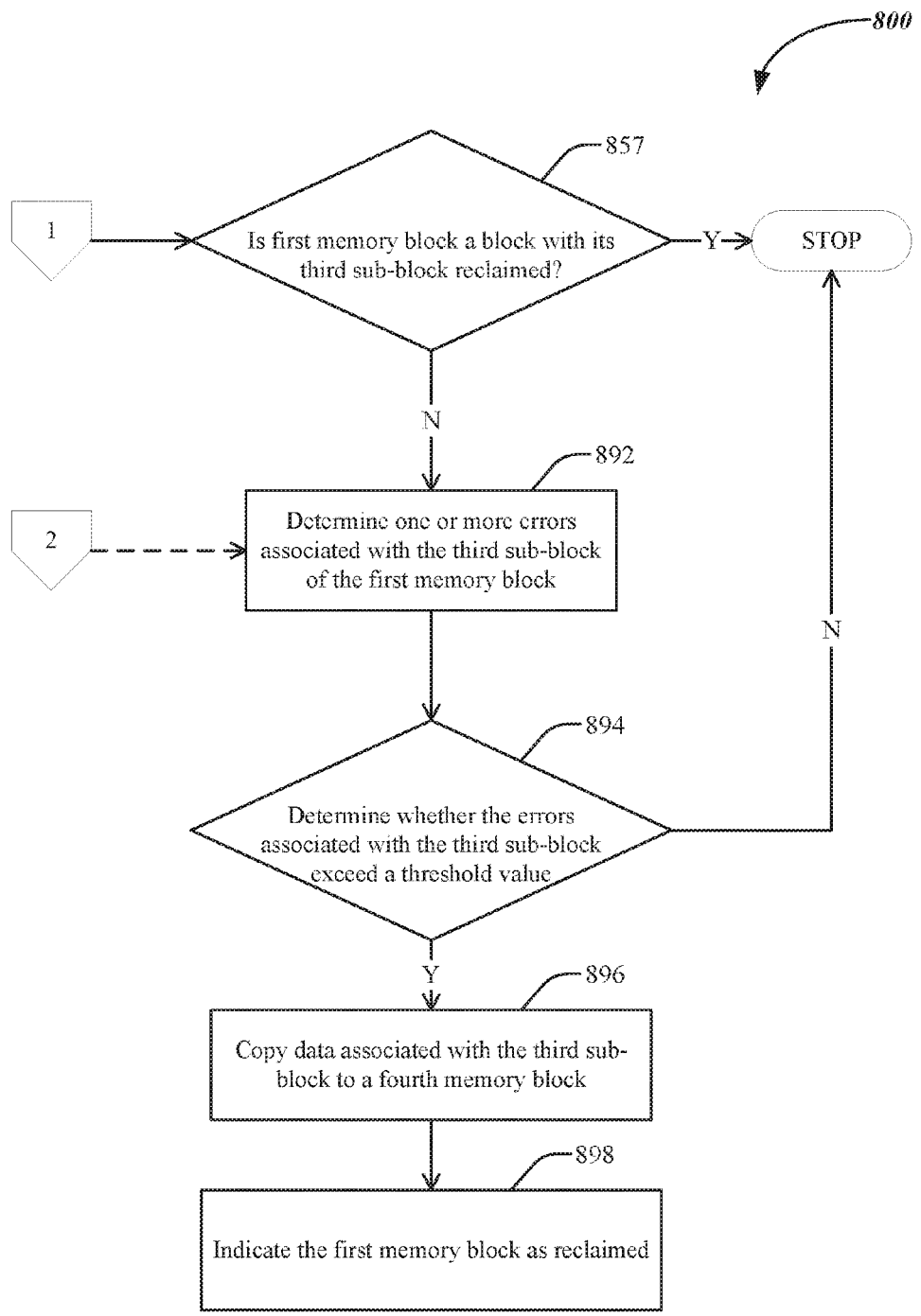
FIG. 8 (Contd...)

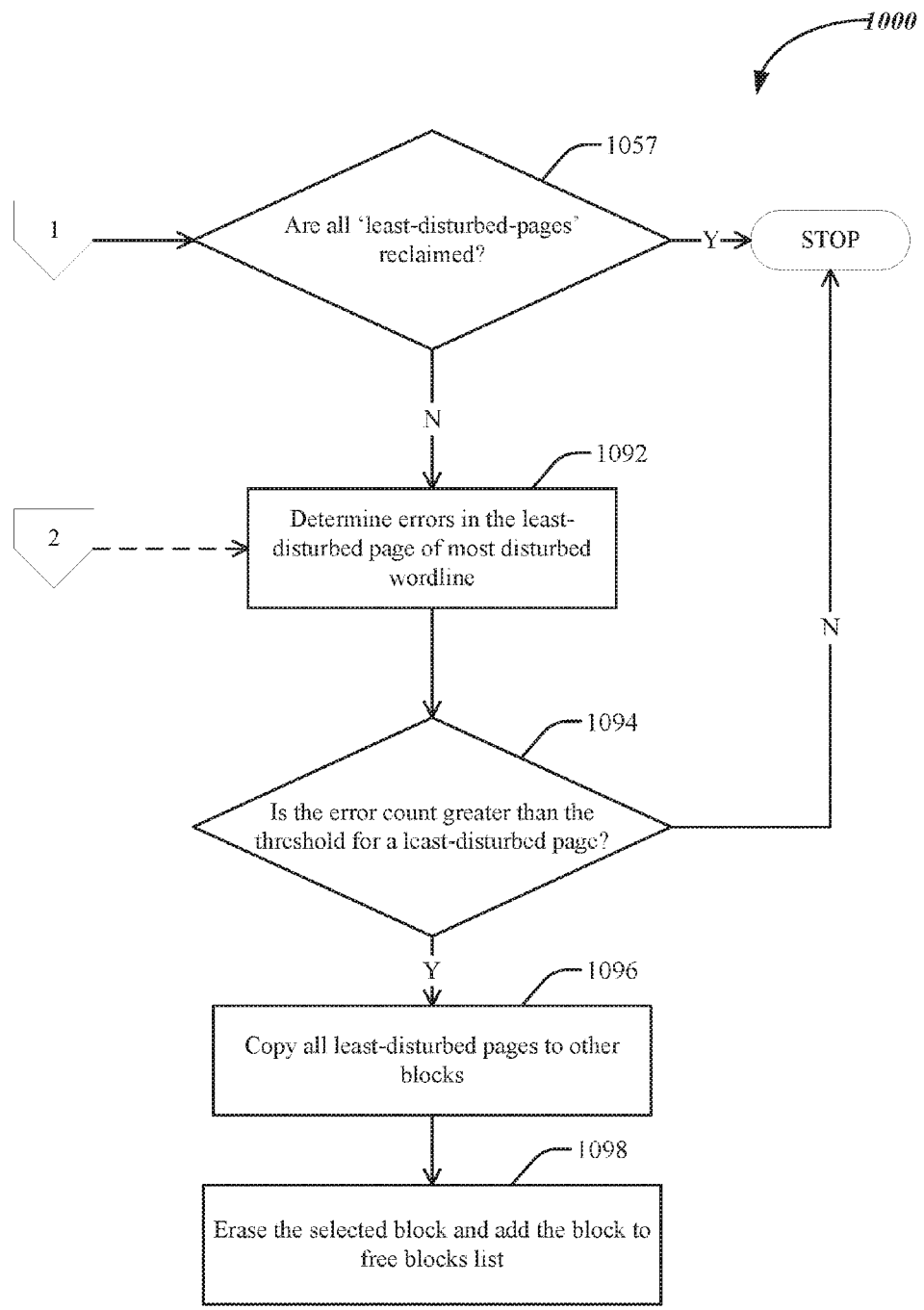
FIG. 10 (Contd...)

US 10,002,073 B2

SELECTIVE DATA RECYCLING IN NON-VOLATILE MEMORY

CROSS-REFERENCES TO RELATED APPLICATIONS

This application is a non-provisional application and claims the benefit and priority of U.S. Provisional Application No. 62/252,140, filed on Nov. 6, 2015, titled "WRITE AMPLIFICATION REDUCTION VIA SELECTIVE DATA RECYCLING," which is herein incorporated by reference in its entirety for all purposes.

FIELD

The present invention relates generally to systems, methods and apparatus for storage devices, and specifically to improving performance of non-volatile memory devices.

BACKGROUND

Non-volatile memory devices such as Solid State Drives (SSDs) are finding new applications in consumer electronics. For example, they are replacing Hard Disk Drives (HDDs), which typically comprise rapidly rotating disks (platters). Non-volatile memories, sometimes referred to as 'flash memories' or 'flash memory devices' (for example, NAND and NOR flash memory devices), are used in media storage, cameras, mobile phones, mobile computers, laptop computers, USB flash drives, etc. Non-volatile memory provides a relatively reliable, compact, cost-effective, and easily accessible method of storing data when the power is off.

In a flash memory such as NAND, a write request for a certain amount of logical data from the host side can lead to multiples of the amount of data actually being programmed into the flash memory. The additional programming, often referred to as "Write Amplification", can be caused by several factors such as garbage collection, disturb reclaim, retention error reclaim, and other internally generated data.

SUMMARY

Embodiments of the invention pertain to systems, methods, and computer-readable instructions that can be used in conjunction with a flash memory device. According to some embodiments, a method can include classifying a first memory block, comprising a plurality of N-level cells, into at least a first sub-block and a second sub-block. The first sub-block can represent a first bit of each of the plurality of N-level cells, and the second sub-block can represent a second bit of each of the plurality of N-level cells. Each N-level cell can store N bits of data. In embodiments, N can be a whole number greater than or equal to 2.

The method can further include determining that a condition associated with the first sub-block is satisfied. Data associated with the first sub-block can be copied to a second memory block different from the first memory block based on the determination that the condition associated with the first sub-block is satisfied.

In some embodiments, determining that a condition associated with the first sub-block is satisfied can include determining one or more errors associated with the first sub-block; and determining that the one or more errors associated with the first sub-block exceed a threshold value. In some examples, the one or more errors associated with the first sub-block can be caused by a read disturb. In some examples, the one or more errors associated with the first sub-block can be caused by a loss of data retention.

In some embodiments, determining that a condition associated with the first sub-block is satisfied can include determining that a number of reads have been performed on the first sub-block. In some embodiments, determining that a condition associated with the first sub-block is satisfied can include determining that a number of program-erase cycles have been performed on the first sub-block.

In some embodiments, the method can further include storing an indicator associated with the first memory block, wherein the indicator indicates that the data associated with the first sub-block of the first memory block has been copied to a different memory block. When the copying (of the first sub-block to a different memory block) is complete, the first memory block can be referred to as a block with its first sub-block 'reclaimed.'

In some embodiments, the method can further include determining that a condition associated with associated with the second sub-block is satisfied. Data associated with the second sub-block can be copied to a third memory block based on the determination that the condition associated with the second sub-block is satisfied.

In some embodiments, the second memory block can be the same as the third memory block. In other embodiments, the second memory block can be different from the third memory block.

In some embodiments, the first memory block can further include a third sub-block, the third sub-block representing a third bit of each of the plurality of N-level cells. In embodiments, the N-level cell can store two, three, four, or more bits of information per cell. Although several concepts below are explained with reference to a two-level cell, it must be noted that they are applicable, without loss of generality, to multi-level cells storing two or more bits of information.

Embodiments also include systems and computer readable media to implement at least the disclosed methods. Examples of such systems and media are provided below.

DETAILED DESCRIPTION

Figure 1:
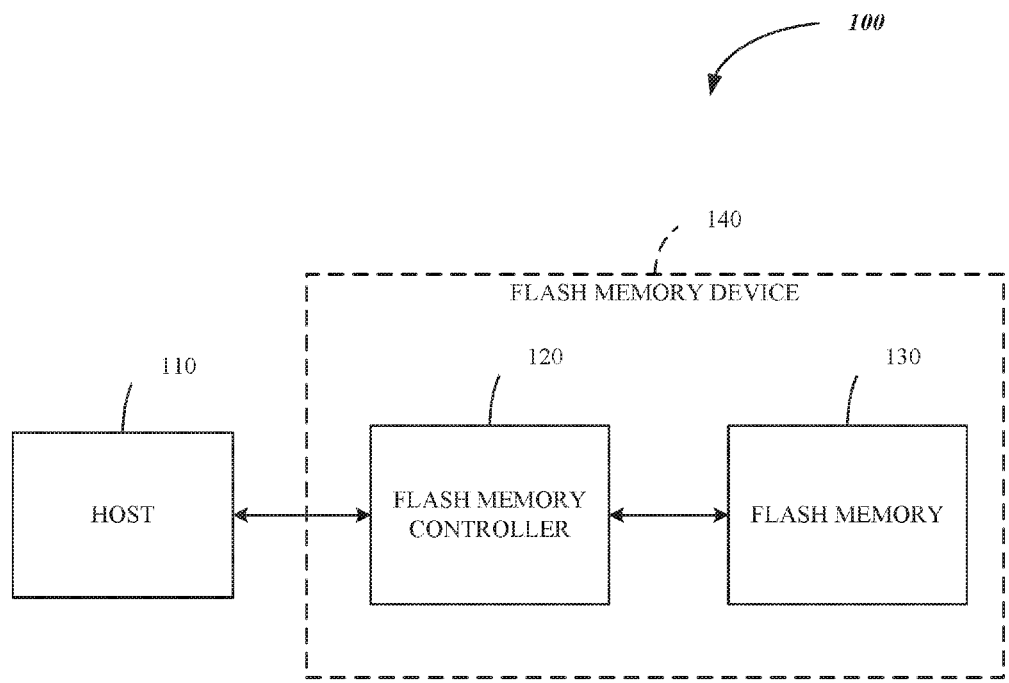
FIG. 1 is a block diagram illustrating a system including a host, a controller, and a non-volatile memory according to embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments. However, it will be apparent that various embodiments may be practiced without these specific details. The figures and description are not intended to be restrictive.

The ensuing description provides examples, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

The following detailed description together with the accompanying drawings in which the same reference numerals are sometimes used in multiple figures to designate similar or identical structures structural elements, provide a better understanding of the nature and advantages of the present invention.

Embodiments of the invention pertain to systems, methods, and computer-readable instructions for copying and/or moving data from one location to another in a flash memory. Methods, systems, and computer-readable media as described in the disclosure can be used, for example, in a NAND flash memory device.

The embodiments disclosed herein are not to be limited in scope by the specific embodiments described herein. Various modifications of the embodiments of the present invention, in addition to those described herein, will be apparent to those of ordinary skill in the art from the foregoing description and accompanying drawings. Further, although some of the embodiments of the present invention have been described in the context of a particular implementation in a particular environment for a particular purpose, those of ordinary skill in the art will recognize that its usefulness is not limited thereto and that the embodiments of the present invention can be beneficially implemented in any number of environments for any number of purposes.

In a flash memory device, a single write command from a host can result in more than one set of programming operations on the flash memory, a phenomenon referred to as "write amplification." For example, data in a block may have to be reclaimed to another block when the error count (caused by various mechanisms) exceeds a threshold. This can result in additional programming, which can eventually affect the total lifetime of the flash memory device.

In some embodiments disclosed, write amplification can be reduced by partially reclaiming/recycling data in an N-level cell having N-bits of data (N>=2). Methods can advantageously exploit differences in electrical and other characteristics between or among bits in each N-level cell. In some embodiments, by logically separating out blocks into sub-blocks for various processes, write amplification can be significantly reduced.

Several processes, such as disturb reclaim and retention refresh, can involve checking a first block for a condition, and copying data from the first block to a different second block based on whether the condition is satisfied. For example, data can be refreshed when, upon cycling or disturb, loss of information is likely to occur. In examples where data is stored as '0's and '1's, loss of information can occur when a bit holding 0 tends to become indistinguishable from a 1, or a bit holding 1 tends to become indistinguishable from a 0. Such copying of existing data can contribute to a phenomenon referred to as "Write Amplification."

Write amplification can be defined as the ratio between the actual amount of data written into a flash memory over the amount of data written from a host device. NAND flash memory based solid-state disk (SSD) can suffer from large write amplification. Write amplification is typically larger than one, and in some instances, could be 5 or more. This implies that one simple write request or operation from the host device can lead to multiple write operations to the flash memory. A large write amplification can significantly increase latency and shorten the storage lifetime. The number of times a flash memory can be re-written or 'cycled' can be limited. Example flash memories can withstand a thousand or a few hundred program-erase cycles.

The total amount of data that can be written into a flash memory over its lifetime can be correlated to 1) the maximum number of program and erase operations (P/E Cycles) that flash memory can tolerate, 2) the total capacity of flash memory, and 3) the average write amplification. The amount of data that can be written during the flash memory lifetime is thus proportional to:

P/E Cycles*Disk Capacity/Write Amplification

As apparent from the equation, the larger the write amplification, the lesser the total amount of data that can be written from the host machine to the flash memory device. In other words, for a given workload running on a host machine, the larger the write amplification, the quicker the flash memory device will use up its P/E Cycles budget and come to the end of lifetime. Thus, reducing write amplification can be a key solution to improving flash memory effective lifetime.

Figure 2:
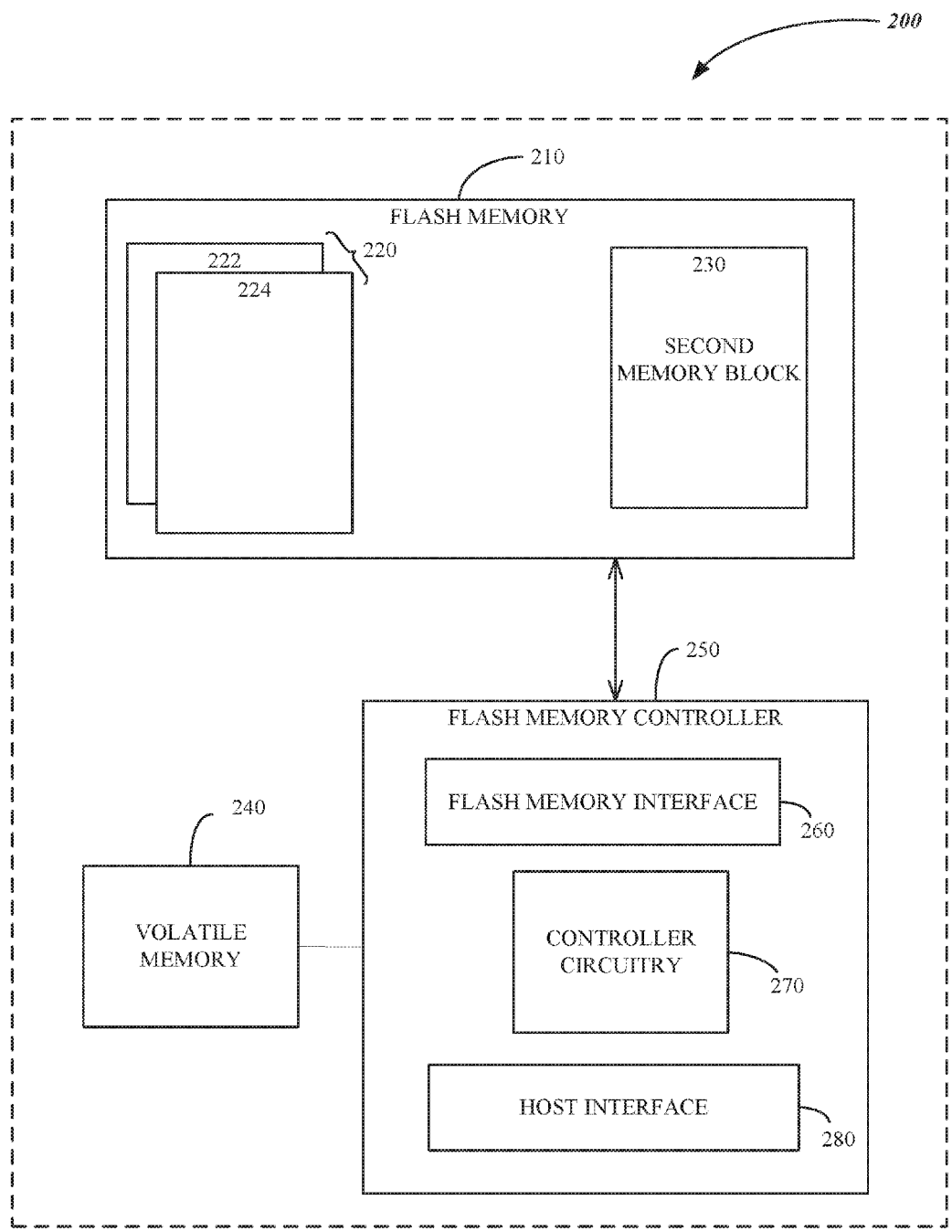
FIG. 2 is a simplified block diagram illustrating a flash memory device according to some embodiments.
Figure 3:
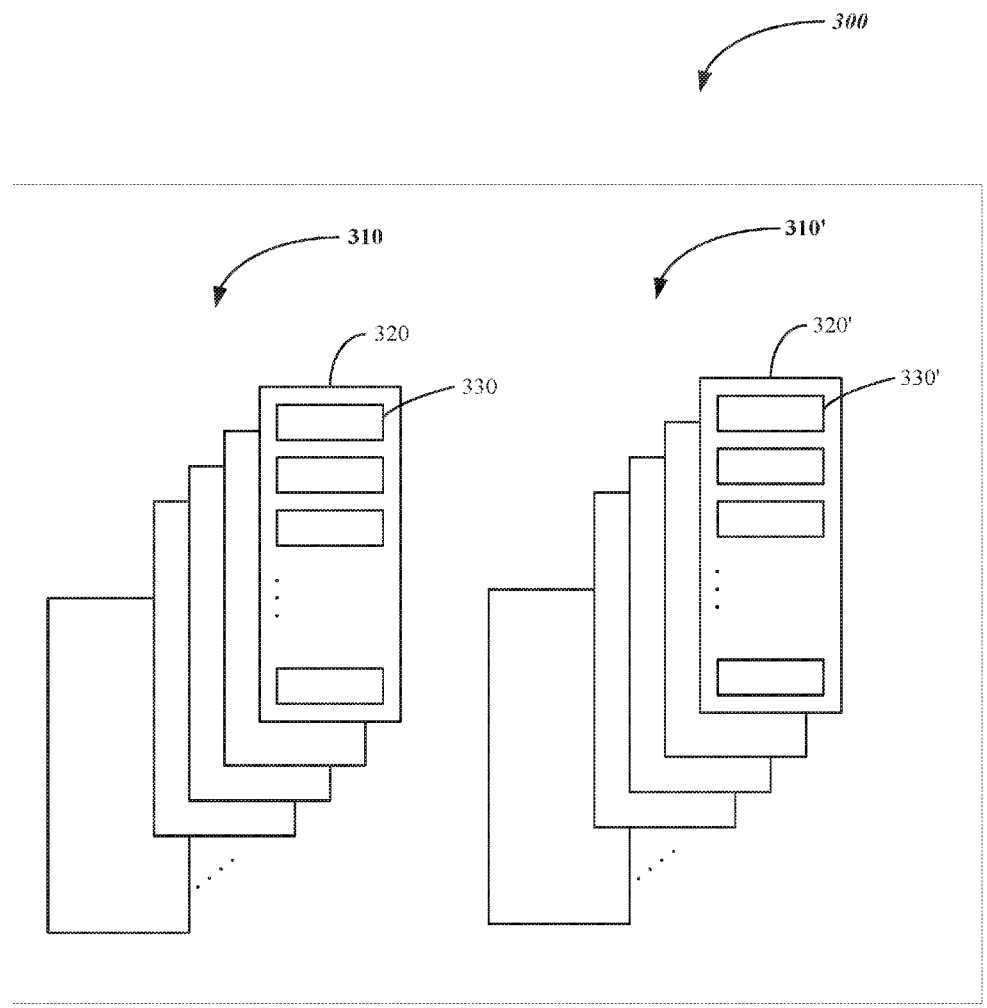
FIG. 3 is a simplified illustration of the organization of an example non-volatile memory die, according to embodiments.
Figure 4:
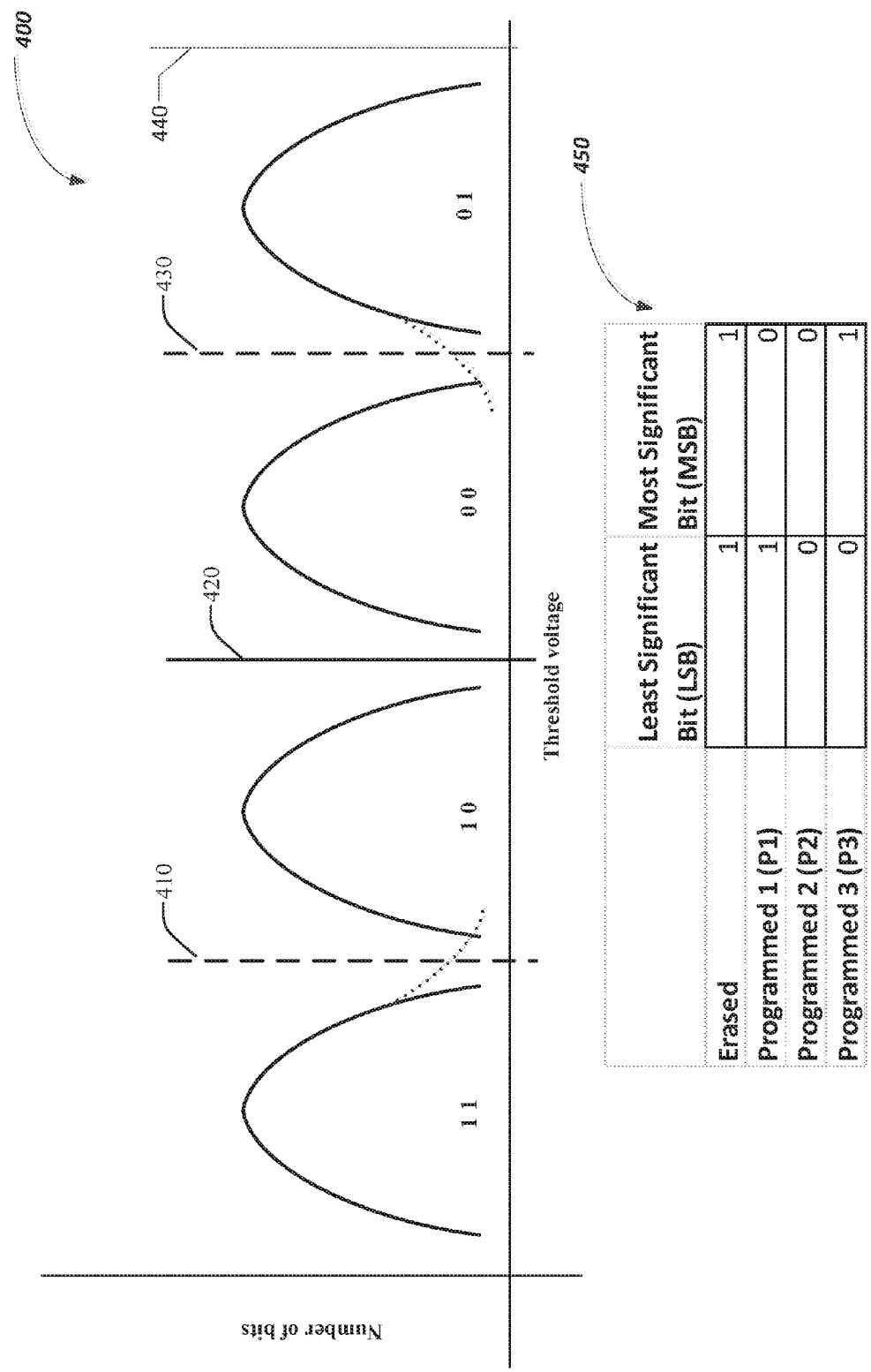
FIG. 4 is an illustration of threshold voltage distributions corresponding to four states of a two-level memory cell, according to embodiments.
Figure 5:
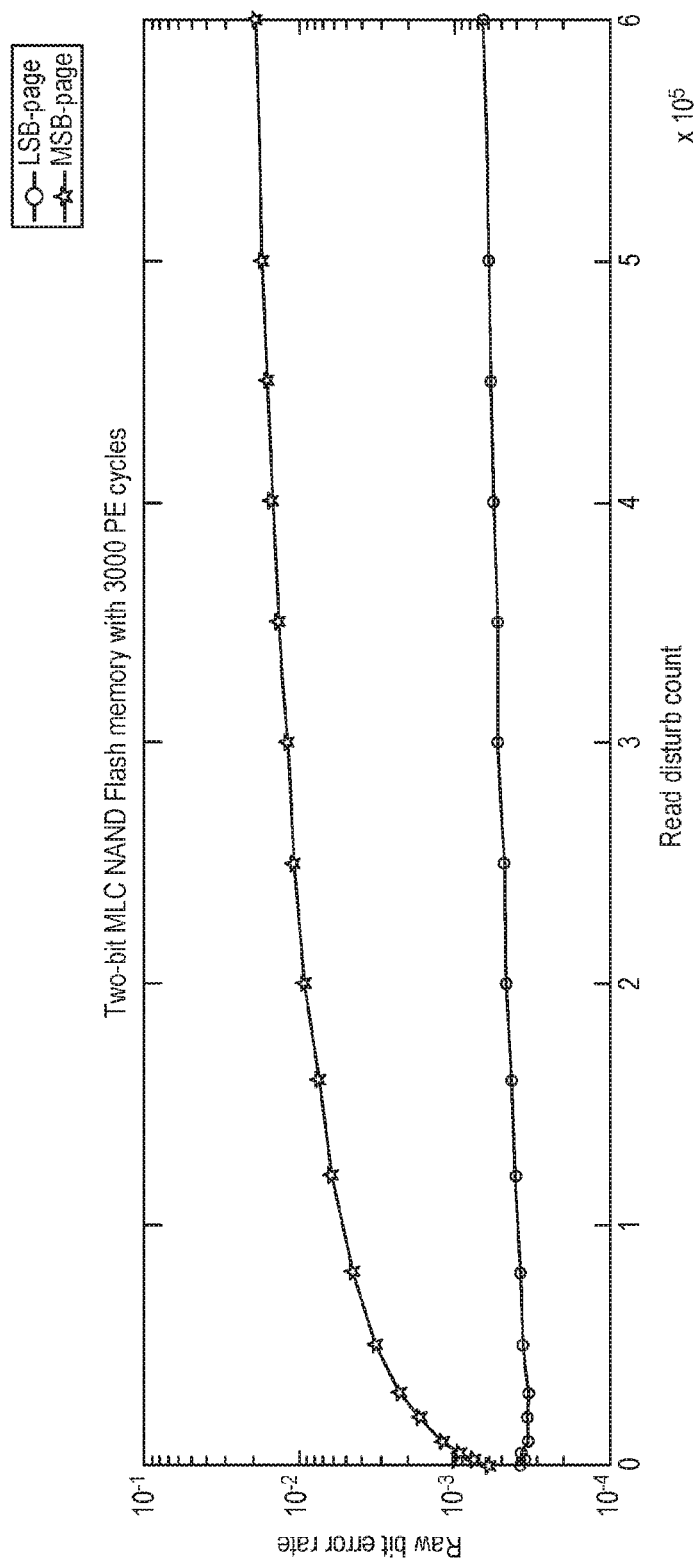
FIG. 5 is a graph illustrating raw bit error rate versus read disturb count for a first sub-block and a second sub-block of a block, according to embodiments.

FIG. 1 describes the general high level architecture of a system comprising a host, a flash memory controller, and a flash memory. FIG. 2 is a simplified block diagram illustrating a flash memory device according to some embodiments. FIG. 3 describes an example of the structure of a flash memory. FIGS. 4 and 5 help illustrate some theoretical background of embodiments of the invention. FIGS. 6-10 are flowcharts illustrating processes according to some embodiments. FIG. 11 is a simplified illustration of a computer device comprising an embodiment.

FIG. 1 is a simplified block diagram illustrating a system 100 including a host 110, a flash memory controller 120, and a flash memory 130, according to embodiments. In some implementations, flash memory 130 can be a NAND flash. In other implementations, non-volatile memory 130 can be a NOR flash memory configured to interact externally as a NAND flash. Flash memory 130 can be designed to store data in the absence of a continuous or substantially continuous external power supply. In some examples, flash memory 130 can be used for secondary data storage, for example, in a computer system such as a laptop. In such examples, a flash memory device 140 can replace a magnetic hard disk drive (HDD). In some examples, flash memory controller 120 can be external to flash memory device 140. In some such examples, flash memory controller 120 can interact with a plurality of flash memories. The architecture and organization of one example flash memory are provided later in the specification. In some embodiments, other non-volatile memory can be used in place of or in addition to flash memory 130. Examples can include read only memory (ROM), a mask ROM (MROM), a programmable ROM (PROM), an erasable programmable ROM (EPROM), an electrically erasable programmable ROM (EEPROM), Ferroelectric RAM (F-RAM), Magnetoresistive RAM (RAM), polymer-based organic memory, holographic memory, phase change memory and the like.

Host 110 can include any appropriate hardware device, software application, or a combination of hardware and software. In some embodiments, host 110 can include a host-side controller (not shown). In embodiments, controller 120 can interface between host 110 and non-volatile memory 130. Controller 120 can be configured to receive various commands from host 110 and interface with non-volatile memory 130 based on these commands. Controller 120 can enable flash memory 130 to perform various operations based on control signals received from host 110. In examples, this can enable host 110 to program, erase, read, or trim parts of flash memory 130.

In some embodiments, in addition to or instead of an internal volatile memory, controller 120 can interface with an external volatile memory. For example, controller 120 can have access to an external DRAM where data can be stored before being transferred to a non-volatile memory.

FIG. 2 is a simplified block diagram illustrating a flash memory device 200 according to some embodiments. As shown in FIG. 2, flash memory device 200 includes a flash memory 210. In some embodiments, flash memory 210 can be a NAND flash memory, i.e., one based on NAND flash architecture. In some embodiments, flash memory 210 can include a plurality of N-level cells, each N-level cell storing N bits of data. Examples of N-level cells, such as multi-level cells (including dual-bit and three-bit cells), are provided later in the specification. Generally, in embodiments, N can be any integer greater than or equal to 2.

Flash memory 210 can include a first memory block 220 and a second memory block 230. First memory block 220 can be logically divided into at least a first sub-block 222 and a second sub-block 224. It is to be noted that first sub-block 222, second sub-block 224, and other sub-blocks (when present) are logical designations and present in the same physical first memory block 220. In embodiments, first sub-block 222 can represent a first bit of each of the plurality of N-level cells, and second sub-block can represent a second bit of each of the plurality of N-level cells.

As explained below with reference to FIGS. 4 and 5, first sub-block 222 and second sub-block 224 can have differing electrical and other characteristics from each other. For example, they can behave differently under Program-Erase (P/E) cycling and can also exhibit different disturb characteristics (such as during read or programming).

Flash memory device 200 can also include a flash memory controller 250. In examples, flash memory controller 250 can include controller circuitry 270, a host interface 280, and a flash memory interface 260. Flash memory interface 260 can include elements (e.g., hardware, software, firmware or any combination thereof) necessary for supporting a flash memory interface protocol.

Controller circuitry 270 can refer to any processing logic, including but not limited to a processor or processing core associated with a processor, Application Specific Integrated Circuit (ASIC), Field Programmable Gate Array (FPGA), or any other circuitry configurable to execute instructions.

As shown in FIG. 2, flash memory device 200 can further include a volatile memory 240. In embodiments, volatile memory 240 can include a DRAM, a Double Data Rate DRAM (DDR DRAM), a Static RAM (SRAM), and/or other volatile memory. In general, the volatile memory can refer to any memory media where the stored data is lost in the absence of continuous or substantially continuous power supply.

Host interface 280 can be used to communicate with a host, such as host 110 of FIG. 1. Host interface 280 can include elements (e.g., hardware, software, firmware or any combination thereof) necessary for supporting a host interface protocol.

In some embodiments, controller circuitry 270 can be configured to classify first memory block 220 into at least first sub-block 222 and second sub-block 224. In examples, first sub-block 222 can represent a first bit of the N bits in each N-level cell and second sub-block 224 can represent a second bit of the N bits in each N-level cell. In a specific example that is not intended to limit the scope of the disclosure, controller circuitry 270 can be configured to classify a block of dual-bit cells into "Least Significant Bit (LSB)" and "Most Significant Bit(MSB)" pages.

Controller circuitry 270 can further be configured to determine that a condition associated with first sub-block 222 is satisfied, and copy data associated with first sub-block 222 to second memory block 230 based on the determination that the condition associated with first sub-block 222 is satisfied.

FIG. 3 is a simplified illustration of the organization of an example flash memory 130, according to embodiments. It is to be noted that the structure shown in FIG. 3 is for illustrative purposes only and the actual physical organization of the flash memory can differ substantially from the depiction.

In the example shown in FIG. 3, flash memory die 300 includes two planes 310 and 310'. Other examples can include a different number of planes per die. A plurality of such dies can be included in a flash memory, such as flash memory 130. Plane 310 can include a plurality of blocks, such as block 320. Plane 310' can include a plurality of blocks, such as block 320'. Block 320 can further include a plurality of pages 330. A page, such as page 330, may share a common word-line and can represent a minimum programmable unit. A page can also represent the minimum readable unit. A block can represent the smallest erasable unit.

Dies such as flash memory die 300 can be organized using different channels. Each channel can have multiple dies attached to it. For example, the first block from the first die, the first block from the second die, the first block from the third die, and so on, can be grouped together and accessed in parallel, thereby forming a superblock. Pages belonging to the same superblock can be, for example, programmed and read in parallel. Although a superblock may not be physically grouped in a unit, logically, a superblock can behave as a block. Methods and systems described in this disclosure as pertaining to blocks can also pertain to superblocks in some embodiments.

The total data written to flash memory is the sum of the data requested to be programmed from host side plus the additional data generated by SSD internal firmware. The additional data generated by flash controller firmware can include at least: (1) additional data programming caused by a garbage collection process to merge valid data from a few victim blocks to a new free block to release more free blocks for future programming; (2) additional data programming caused by data recycling because of read disturb reclaim where valid data in a reclaimed block are copied to free blocks to eliminate accumulated read disturb errors; (3) additional data programming caused by data recycling for periodic data refresh, which targets to control data retention errors; and 4) other internally generated data.

The garbage collection process in a NAND flash memory is an example of a process that leads to an increase in write amplification. Due to intrinsic limitations of a NAND flash memory device, flash media (e.g., flash blocks) may need to be erased before it is programmable (or -reprogrammable). Because of the large latency of erase operation, the flash controller (i.e. firmware) can reserve a list of free blocks that have been erased. When a new write command is sent from the host, the flash controller can program the data to be written into flash memory pages that have already been erased. This can remove the erase operation from the critical path (the time between receiving a write command and the data being written into the flash memory) and save the latency of program operation. When the number of free blocks is below a certain threshold due to continuous host data writing, a garbage collection procedure may be triggered. The garbage collection (GC) procedure selects a few blocks with the least number of valid data and copies the valid data of those selected victim blocks to a free block. Then, garbage collection can erase those victim blocks that were selected to move data and put them in the list of free blocks. During the GC procedure, moving valid data from victim blocks to target blocks can cause additional program operations and thus increase the write amplification.

Recycling during a read disturb reclaim process can also cause write amplification. In examples of the read disturb reclaim process, when the worst wordline (i.e. the wordline with most disturbed bits) in a block accumulates enough errors that could cause potential uncorrectable (by the ECC) error for the next read disturb check, all valid data in the block can be copied to a new free block. The victim disturbed block can then be marked for erasure. This moving of valid data from a victim block to a new free block causes additional data writing and thus contributes to additional write amplification.

Recycling during a retention refresh process can also cause write amplification. In examples of retention refresh, when the worst wordline in a block accumulates enough retention errors that could cause potential uncorrectable (by the ECC) error for the next retention check, all valid data in the block can be copied to a new free block. The victim block can be marked for erasure. This moving of valid data from a victim block to a new free block causes additional data writing and thus contributes to additional write amplification.

In summary, the write amplification may be caused by at least: 1) garbage collection, 2) read disturb reclaim and 3) retention refresh. If the amount of any additional data caused by these procedures can be reduced, the write amplification can be reduced, and thereby, both the latency and lifetime of flash memory based data storage can be improved.

Read disturb refers to the phenomenon where reading data from a flash cell can cause the threshold voltages of other unread cells in the same block to shift higher. Read disturb is caused by the weak programming that can occur when a pass-through voltage (Vpass) is applied to the wordlines from which data is not being read.

In a multi-level cell, read disturb can affect different bits of the multi-level cell different. The theory behind the differences is explained below with reference to a two-level cell in conjunction with FIG. 4 and FIG. 5, but the concept applies more broadly to a multi-level cell comprising 3 or more bits. Besides, in a multi-level cell, data retention behavior can be different for different bits of the multi-level cell.

FIG. 4 is an illustration of the variation of threshold voltage by state in a two-level cell through plot 400 and correspond table 450. As illustrated in FIG. 4, the threshold voltage (Vth) range of a 2-bit flash cell is divided into four regions by three reference voltages marked by lines 410, 420, and 430. As indicated in corresponding table 450, the four states of a cell are labelled Erased (11), P1 (10), P2 (00), and P3 (01). It is worth noting that such labelling is simply one example, and the states can be labelled differently according to different conventions. Each state can decode into a 2-bit value that is stored in the flash cell (e.g., 11, 10, 00, or 01). The two bits in this 2-bit value can be referred to as a Least Significant bit (LSB) indicating the bit on the left, and a Most Significant Bit (MSB) indicating the bit on the right. The threshold voltage of all flash cells in a chip can be bounded by an upper limit of pass-through voltage marked by line 440. As shown in FIG. 4, line 420 represents an LSB reference voltage, whereas lines 410 and 430 represent MSB reference voltages.

For two-bit cells such as shown in FIG. 4, the LSB page and MSB pages of a block can exhibit different read disturb characteristics. The electric field strength in a flash cell is linearly proportional to the difference between the Vpass voltage (line 440) applied to the floating gate and the threshold voltage of the specific flash cell. The weak programming current in the tunnel oxide is exponentially correlated to the electric field strength. Thus, the read disturb on flash cells in erased "11" state (lowest threshold voltage) can be much greater than any other programmed state. The page type that has read reference voltage between the erased state and first programmed state (line 410) can suffer from the largest read disturb errors. In the example shown in FIG. 4, the MSB page of the two-bit MLC flash memory, with one of its read reference voltages marked by line 410, suffers most read disturb errors. The disturbed distribution is indicated through a dotted tail in the "11" distribution. Given the same wordlines that are most disturbed, the MSB page error rate can be much higher than that of the LSB page.

FIG. 5 illustrates the variation of the raw Bit Error Rate/Ratio (BER) with the read disturb count for the LSB page and MSB page of a flash memory comprising two-level cells. The raw BER can represent the number of bit errors divided by the total number of bits read before correction (such as by Error Correction Code, 'ECC'). The flash memory of FIG. 5 has been cycled 3000 times. FIG. 5 shows the variation of raw BER of the LSB and MSB page as the read disturb count is increased, for a flash memory that has already been re-programmed 3000 times. Assuming the ECC in flash memory can correct a raw BER of up to $10^{-3}$, it is clear from FIG. 5 that MSB pages fail the ECC correction limit and may need to be reclaimed after about 10 K reads. However, the LSB page can last over 600 K reads without reaching the error correction capability of ECC. In other words, the lifetime of LSB page data is much longer than that of the MSB page (by >100 times) for read disturbs.

For two-bit cells such as shown in FIG. 4, the LSB page and MSB pages of a block can also exhibit different P/E cycling retention characteristics. In FIG. 4, the state read with reference line 430 can exhibit the worst retention because retention errors can mostly happen because of the distribution alias between the two highest states P2 and P3. Loss of retention leads to a distribution indicated through a dotted tail in the "01" distribution. Although the underlying physical mechanism and theory may be different, for retention errors, the MSB page error rate can also be higher than that of the LSB page.

According to embodiments, when the MSB page error rate is significantly higher than the LSB page error rate, reclamation of data in the block can be separated for the MSB pages and LSB pages. More generally, a block can be classified into at least a first sub-block and a second sub-block, each sub-block logically representing a different bit in a multi-level cell. In some embodiments the sub-blocks can represent pages of one kind of bits in the block. Advantageously, the sub-blocks that are more prone to error (for example, sub-blocks that suffer from more read disturb or retention errors) can be reclaimed to a different block before the sub-blocks that are less prone to error.

Separating reclamation by sub-blocks as described above can reduce write amplification for at least two reasons: (1) some sub-blocks that are less prone to error can be reclaimed less frequently, thereby reducing the number of data copy processes. In some examples in two-level memory cells, the least significant bits can tolerate a read disturb count of 60-100 times the read disturb count that the most significant bits can tolerate; and (2) data in the sub-blocks that are less prone to error can become invalid because of subsequent write commands during the time the block is partially reclaimed. In other words, less-error-prone sub-blocks may be overwritten by future writes to the same logical address (or trim commands) between the time of first partial reclaim and the time the whole block is completely reclaimed by either garbage collection or a second partial reclaim.

It is to be noted that the page type classification is based on read disturb errors and retention errors can be different for flash memory with different architecture. But the idea of classifying the pages into multiple types based on error rate and selectively reclaiming or refreshing the data based on the page type classification can be applicable to several sources of error, including read disturb and retention errors.

Figure 6:
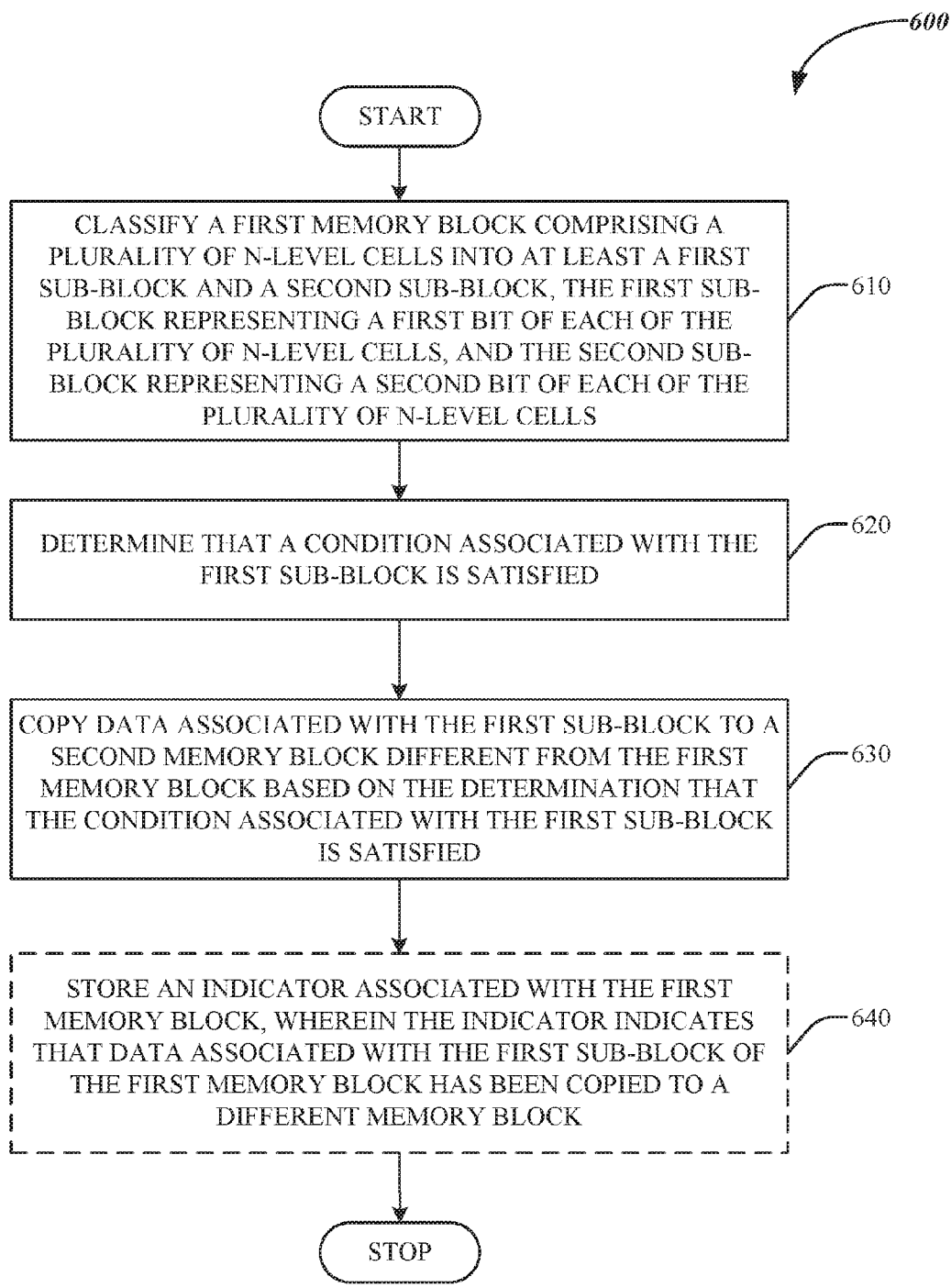
FIG. 6 is a flowchart illustrating a method in a flash memory device, according to embodiments.

FIG. 6 is a flowchart illustrating a process 600 in a flash memory device, according to embodiments. One example where process 600 can be applied is in a NAND flash memory. Although process 600 is explained below as it is performed by flash memory device 200 of FIG. 2, it should be noted that other systems and apparatus can be used in place of flash memory device 200 to perform process 600 and other processes described in the disclosure.

At step 610, process 600 includes classifying a first memory block comprising a plurality of N-level cells into at least a first sub-block and a second sub-block. The first sub-block can represent a first bit of each of the plurality of N-level cells, and the second sub-block can represent a second bit of each of the plurality of N-level cells. Each N-level cell stores N bits of data. In some embodiments, N can be two, and the block can comprise dual-bit cells. In some embodiments, N can be three. In other embodiments N can be an integer greater than three.

In some embodiments, the first sub-block can exhibit different program-erase (P/E) cycling characteristics than the second sub-block. In some embodiments, the first sub-block can exhibit different read disturb characteristics than the second sub-block. In some embodiments where N is 2 and a flash memory cell includes a Most Significant Bit (MSB) and Least Significant Bit (LSB), the first sub-block can represent an MSB page of the first memory block, and the second sub-block can represent an LSB page of the first memory block. In some embodiments where N is 3, the flash memory cell can include a Most Significant Bit (MSB), Center Significant Bit (CSB), and Least Significant Bit (LSB). In those embodiments, the first memory block can include a third sub-block representing the third bit of the multi-level-cell. The first sub-block can represent an MSB page of the first memory block, the second sub-block can represent a CSB page of the first memory block, and the third sub-block can represent an LSB page of the first memory block.

At step 620, process 600 includes determining that a condition associated with the first sub-block is satisfied. In some embodiments, determining that the condition associated with the first sub-block is satisfied can include determining one or more errors associated with the first sub-block, and determining that the one or more errors associated with the first sub-block exceed a threshold value. In some such embodiments, the one or more errors associated with the first sub-block can be caused by read disturb as explained above. In other such embodiments, the one or more errors associated with the first sub-block can be caused by a loss of data retention, for example, through P/E cycling as explained above. In some embodiments, the read for errors can be based on an optimum read reference voltage that already minimizes the number of errors.

In some embodiments, the determining that the condition associated with the first sub-block is satisfied can include determining a number of reads associated with the first sub-block. The number of reads associated with the first sub-block can be based on the number of reads it takes for the first sub-block to reach an estimated number of errors. Such an estimated number of errors can be calculated based on the number of errors an Error Correction Code (ECC) at the flash memory controller can handle and/or fix. In examples, the number of reads before which the first sub-block has estimated errors that would require it to be reclaimed can be significantly lesser than the number of reads before which the second sub-block has estimated errors that would require it to be reclaimed.

In some embodiments, the determining that the condition associated with the first sub-block is satisfied can include determining a number of programming or P/E cycles associated with the first sub-block. The number of cycles associated with the first sub-block can be based on the number of cycles it takes for the first sub-block to reach an estimated number of errors. Such an estimated number of errors can be calculated based on the number of errors an Error Correction Code (ECC) at the flash memory controller can handle and/or fix.

At step 630, process 600 includes copying data associated with the first sub-block to a second memory block different from the first memory block based on the determination that the condition associated with the first sub-block is satisfied. In embodiments, this copying can be part of a reclamation process to reclaim data from the first memory block. Such a reclamation process can lead to an increase in write amplification.

In some embodiments, at step 640, process 600 optionally includes storing an indicator associated with the first memory block, wherein the indicator indicates that the data associated with the first sub-block of the first memory block has been copied to a different memory block. When the copying (of the first sub-block to a different memory block) is complete, the first memory block can be referred to as a block with its first sub-block 'reclaimed.' In examples, this can be through an indicator bit in a meta page associated with the block. Although not shown in FIG. 6, in some blocks, the partially reclaimed first memory block can still be periodically checked, until a future refresh or until garbage collection or wear leveling process recycles the data in the first memory block.

Figure 7:
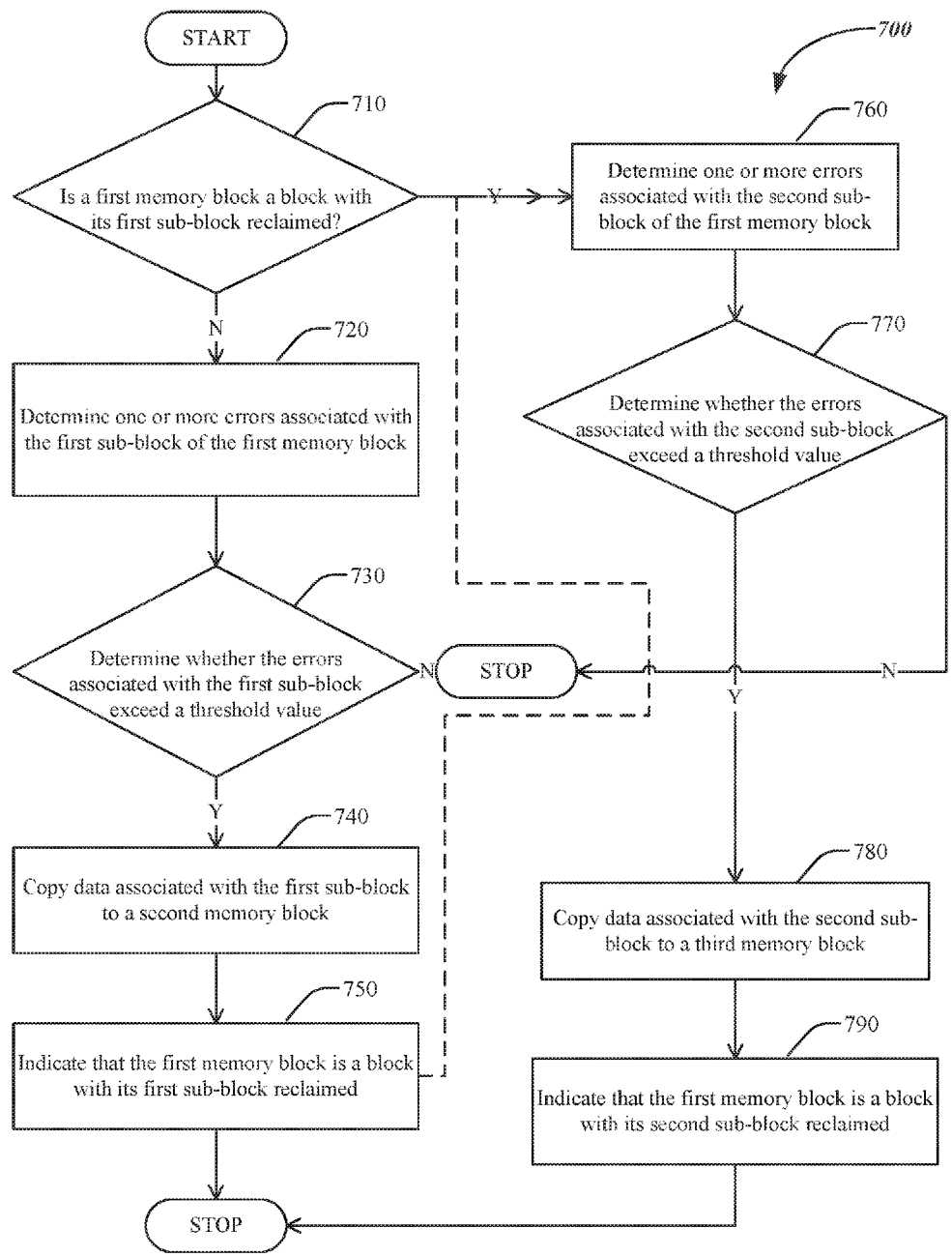
FIG. 7 is a flowchart illustrating another method in a flash memory device, according to embodiments.

FIG. 7 is a flowchart illustrating a process 700 in a flash memory device, according to embodiments. One example where process 700 can be applied is in a NAND flash memory. At step 710, process 700 includes checking whether a first memory block is a block with data associated with a first sub-block reclaimed. Such a check can be performed in various ways. For example, an indicator bit in the Flash Translation Layer (FTL) can indicate whether it is a block with data associated with the first sub-block reclaimed. In some embodiments, information regarding whether a sub-block has been reclaimed is stored in a meta data page in the flash memory. In some examples, the indicator bit can be present in a volatile memory such as DRAM coupled with a flash memory controller. In other examples, if physical addresses corresponding to the first sub-block have corresponding valid logical addresses, that may indicate that data associated with the first sub-block is valid. In another example where the FTL is implemented as a part of software in a host system, the indicator bit may reside in the Operating System of such software.

If it is determined at step 710 that the first memory block does not have its first sub-block reclaimed, at step 720, process 700 includes determining one or more errors in the first sub-block of the first memory block. Such a determination can be based on, for example, estimation of threshold voltages of the bits in the first memory block. Continuing along the branch, at step 730, process 700 includes determining whether the errors in the first sub-block exceed a threshold value. If the errors in the first sub-block do not exceed the threshold value, process 700 can end.

If the errors in the first sub-block exceed a threshold value, at step 740, process 700 includes copying data associated with the first sub-block to a second memory block in the flash memory. Although not shown in FIG. 7, step 740 can also include updating a mapping table to indicate new mapping of logical addresses to addresses in the second memory block.

At step 750, process 700 includes indicating that the first memory block is a block with its first sub-block reclaimed. In some embodiments, this can be done using an indicator bit in the FTL. In some embodiments, process 700 can end after step 750. In other embodiments, process 700 can continue to step 760 after step 750.

Turning back to process 700 at step 710, if it is determined at step 710 that the first memory block is a block with its first sub-block reclaimed, at step 760, process 700 includes determining one or more errors in the second sub-block of the first memory block. Such a determination can be based on, for example, estimation of threshold voltages of the bits in the first memory block. Continuing along the branch, at step 770, process 700 includes determining whether the errors in the second sub-block exceed a threshold value. If the errors in the second sub-block do not exceed the threshold value, process 700 can end.

If the errors in the second sub-block exceed a threshold value, at step 780, process 700 includes copying data associated with the second sub-block to a third memory block in the flash memory. In some embodiments, the third memory block can be the same as the second memory block. Although not shown in FIG. 7, step 780 can also include updating a mapping table to indicate new mapping of logical addresses to addresses in the third memory block.

At step 790, process 700 includes indicating that the first memory block is a block with its second sub-block reclaimed. In a two-level memory cell, this could represent an indication that the entire first memory block has been reclaimed.

Figure 8:
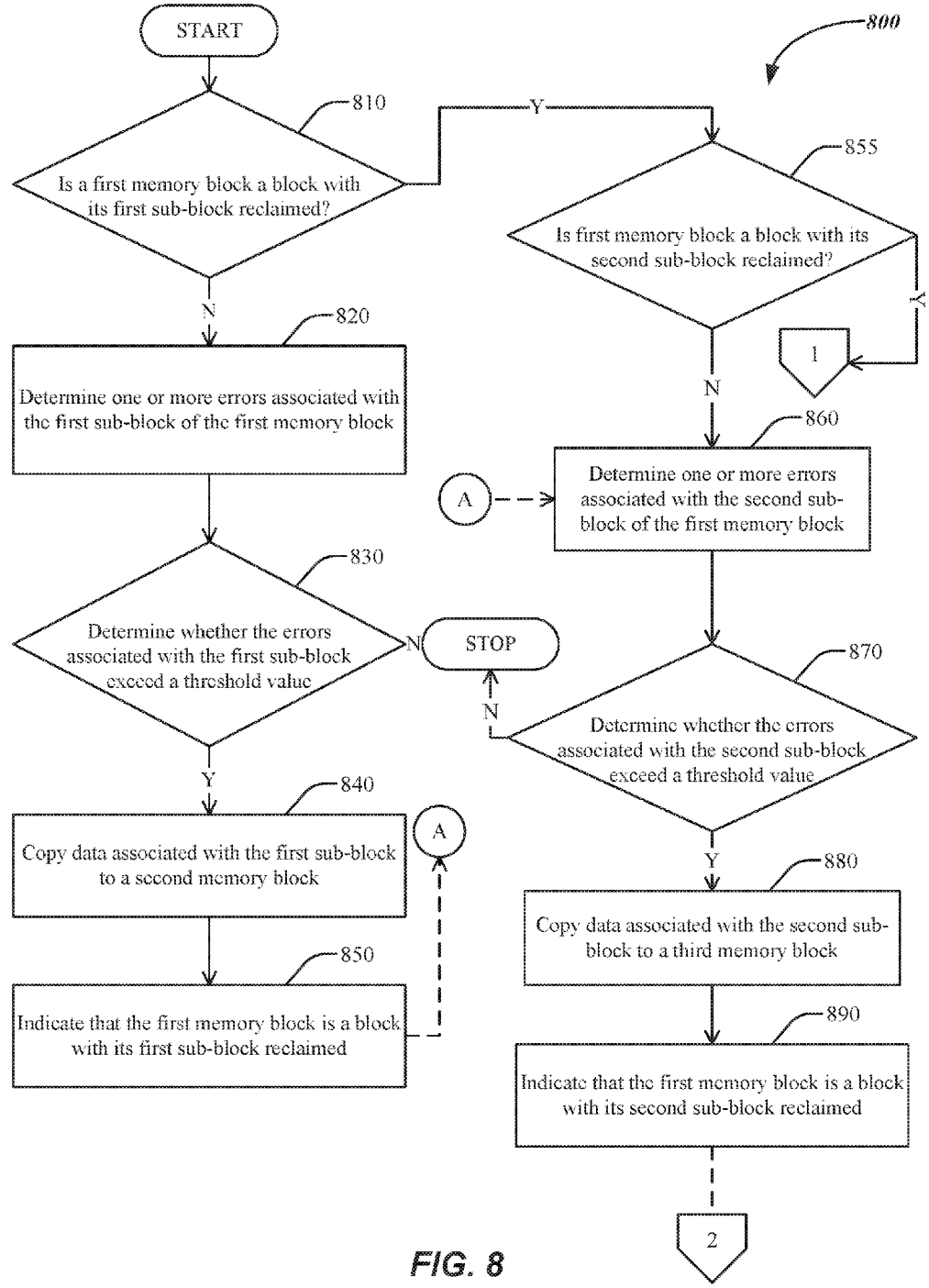
FIG. 8 is a flowchart illustrating another method in a flash memory device, according to embodiments.

FIG. 8 is a flowchart illustrating process 800 in a flash memory device for a three-level memory cell, according to embodiments. Process 800 can operate in a flash memory comprising a plurality of 3-level cells. More generally, process 800 can be extended by one skilled in the art to apply to a flash memory comprising a plurality of N-level cells, where N is greater than or equal to 3. One example where process 800 can be applied is in a NAND flash memory.

At step 810, process 800 includes checking whether a first memory block is a block with its first sub-block reclaimed. Such a check can be performed in various ways. For example, an indicator bit in the Flash Translation Layer (FTL) can indicate whether it is a block with data associated with the first sub-block reclaimed. In some embodiments, information regarding whether a sub-block has been reclaimed is stored in a meta data page in the flash memory. In some examples, the indicator bit can be present in a volatile memory such as DRAM coupled with a flash memory controller. In other examples, if physical addresses corresponding to the first sub-block have corresponding valid logical addresses, that may indicate that data associated with the first sub-block is valid.

If it is determined at step 810 that the first memory block does not have its first sub-block reclaimed, at step 820, process 800 includes determining one or more errors in the first sub-block of the first memory block. Such a determination can be based on, for example, estimation of threshold voltages of the bits in the first memory block. In some embodiments, the read for errors can be based on an optimum read reference voltage that already minimizes the number of errors. Continuing along the branch, at step 830, process 800 includes determining whether the errors in the first sub-block exceed a threshold value. If the errors in the first sub-block do not exceed the threshold value, process 800 can end.

If the errors in the first sub-block exceed a threshold value, at step 840, process 800 includes copying data associated with the first sub-block to a second memory block in the flash memory. Although not shown in FIG. 8, step 840 can also include updating a mapping table to indicate new mapping of logical addresses to addresses in the second memory block.

At step 850, process 800 includes indicating that the first memory block is a block with its first sub-block reclaimed. In some embodiments, this can be done using an indicator bit in the FTL. In some embodiments, process 800 can end after step 850. In other embodiments, process 800 can continue to step 860 after step 850.

Turning back to process 800 at step 810, if it is determined at step 810 that the first memory block is a block with its first sub-block reclaimed, at step 855, process 800 includes determining whether the first memory block is a block with a second sub-block reclaimed.

If it is determined at step 855 that the first memory block does not have its second sub-block reclaimed, at step 860, process 800 includes determining one or more errors in the second sub-block of the first memory block. Such a determination can be based on, for example, estimation of threshold voltages of the bits in the first memory block. Continuing along the branch, at step 870, process 800 includes determining whether the errors in the second sub-block exceed a threshold value. If the errors in the second sub-block do not exceed the threshold value, process 800 can end.

If the errors in the second sub-block exceed a threshold value, at step 880, process 800 includes copying data associated with the second sub-block to a third memory block in the flash memory. Although not shown in FIG. 8, step 840 can also include updating a mapping table to indicate new mapping of logical addresses to addresses in the third memory block. In some embodiments, the third memory block can be the same as the second memory block.

At step 890, process 800 includes indicating that the first memory block is a block with its second sub-block reclaimed. In some embodiments, this can be done using an indicator bit in the FTL. In some embodiments, process 800 can end after step 890. In other embodiments, process 800 can continue to step 892 after step 890.

Turning back to process 800 at step 855, if it is determined at step 855 that the first memory block is a block with its second sub-block reclaimed, at step 857, process 800 includes determining whether the first memory block is a block with a third sub-block reclaimed.

If it is determined at step 857 that the first memory block does not have its third sub-block reclaimed, at step 892, process 800 includes determining one or more errors in the third sub-block of the first memory block. Such a determination can be based on, for example, estimation of threshold voltages of the bits in the first memory block. At step 894, process 800 includes determining whether the errors in the third sub-block exceed a threshold value. If the errors in the third sub-block do not exceed the threshold value, process 800 can end.

If the errors in the third sub-block exceed a threshold value, at step 896, process 800 includes copying data associated with the third sub-block to a fourth memory block in the flash memory. Although not shown in FIG. 8, step 896 can also include updating a mapping table to indicate new mapping of logical addresses to addresses in the fourth memory block. In some embodiments, the fourth memory block can be the same as the second and third memory blocks.

At step 898, process 800 includes indicating that the first memory block is a block with all sub-blocks reclaimed.

Figure 9:
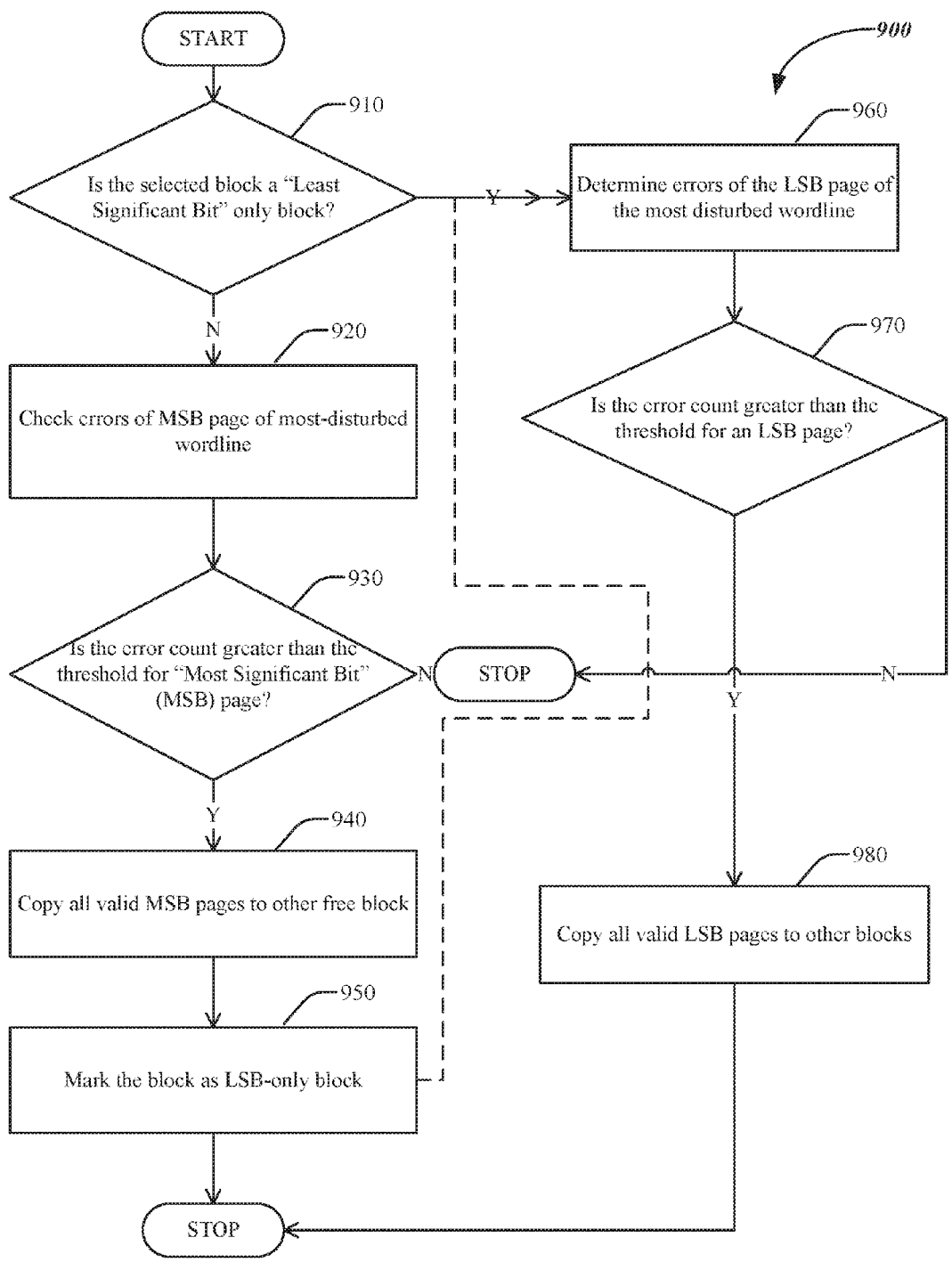
FIG. 9 is a flowchart illustrating another method in a flash memory device, according to embodiments.

FIG. 9 is a flowchart illustrating a process 900 in a flash memory device, according to embodiments. One example where process 900 can be applied is in a NAND flash memory comprising 2-level cells. At step 910, process 900 includes checking whether a selected block is "Least Significant Bit (LSB) only block". Such a check can be performed in various ways. For example, an indicator bit in the Flash Translation Layer (FTL) can indicate whether the block is an LSB-only block. In some embodiments, information regarding whether a sub-block has been reclaimed is stored in a meta data page in the flash memory. In some examples, the indicator bit can be present in a volatile memory such as DRAM coupled with a flash memory controller. In other examples, if physical addresses corresponding to the Most Significant Bit (MSB) pages have corresponding valid logical addresses, that may indicate the selected block is not an LSB-only block.

If it is determined at step 910 that the selected block is not an LSB-only block (that is, it includes valid MSB pages), at step 920, process 900 includes checking errors of the MSB page of the most disturbed wordline. In such embodiments, the most disturbed wordline can be used as an indication of the amount of disturb in the block. In other embodiments, other pages or wordlines can be checked. For example, several wordlines that corresponding to the highest disturbs can be checked to account for process variation. In some embodiments, errors can be caused by read disturb. In some embodiments, errors can be caused by P/E cycling. In some embodiments, errors can be caused by a combination of various disturb mechanisms.

Continuing along the branch, at step 930, process 900 includes determining whether the error count in the most disturbed wordline is greater than the threshold error count for an MSB page. If the error count does not exceed the threshold, process 900 can end.

If the error count of the most disturbed wordline exceeds the threshold value, at step 940, process 900 includes copying all valid MSB pages to another free block in the flash memory. At step 950, process 900 includes indicating that the selected block is an LSB-only block. In some embodiments, process 900 can end after step 950. In other embodiments, process 900 can continue to step 960 after step 950.

Turning back to process 900 at step 910, if it is determined at step 910 that the selected block is an LSB-only block, at step 960, process 900 includes determining one or more errors of the LSB-page of the most disturbed wordline. Continuing along the branch, at step 970, process 900 includes determining whether the error count exceeds the threshold for an LSB page. In some embodiments, the threshold error count for an LSB page and MSB page can be substantially the same. If the error count of the LSB-page of the most disturbed wordline does not exceed the threshold value for an LSB-page, process 900 can end.

If the error count of the LSB-page of the most disturbed wordline exceeds the threshold value for an LSB page, at step 980, process 900 includes copying all valid LSB pages to other blocks.

Figure 10:
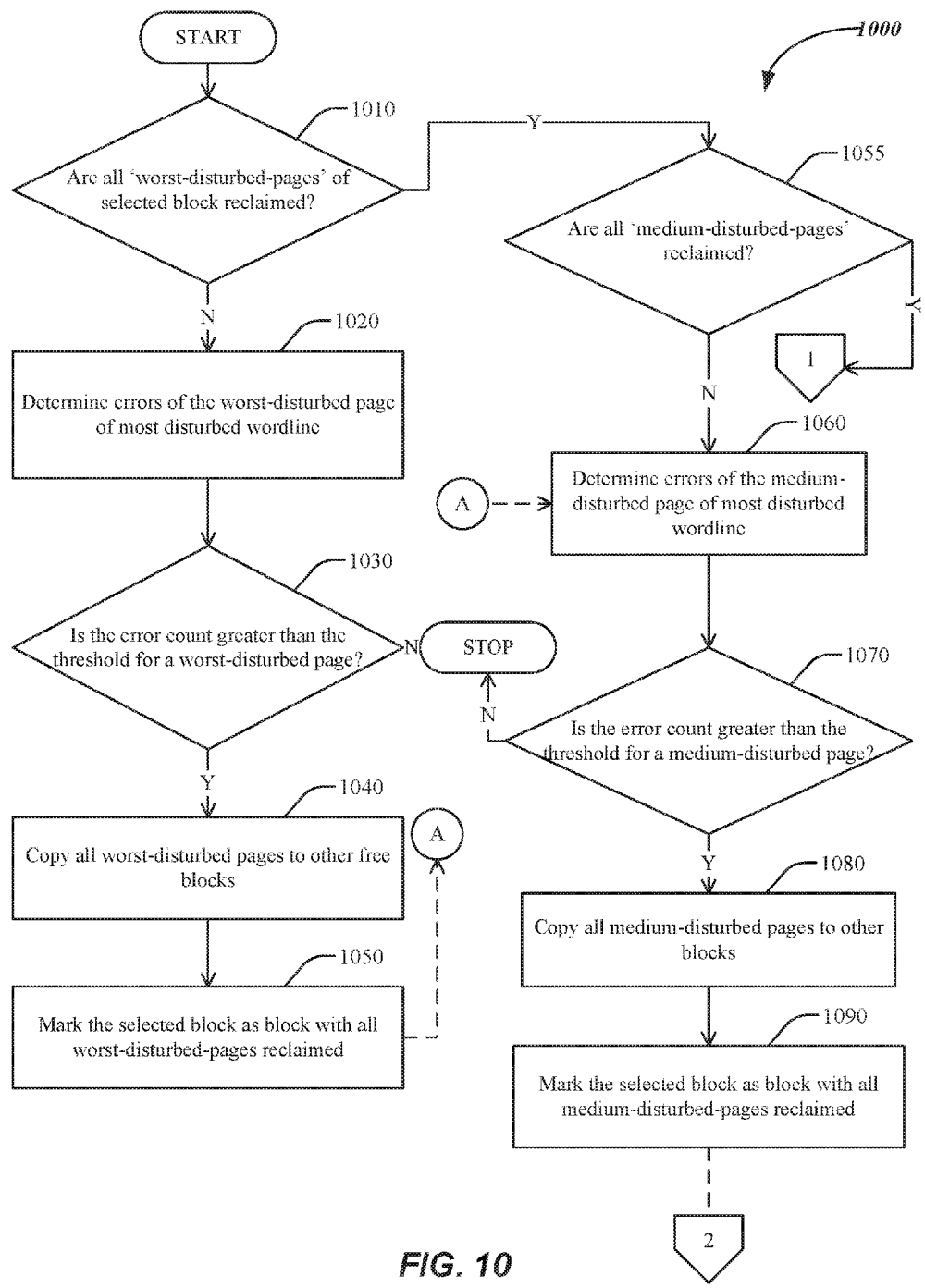
FIG. 10 is a flowchart illustrating another method in a flash memory device, according to embodiments.
Figure 11:
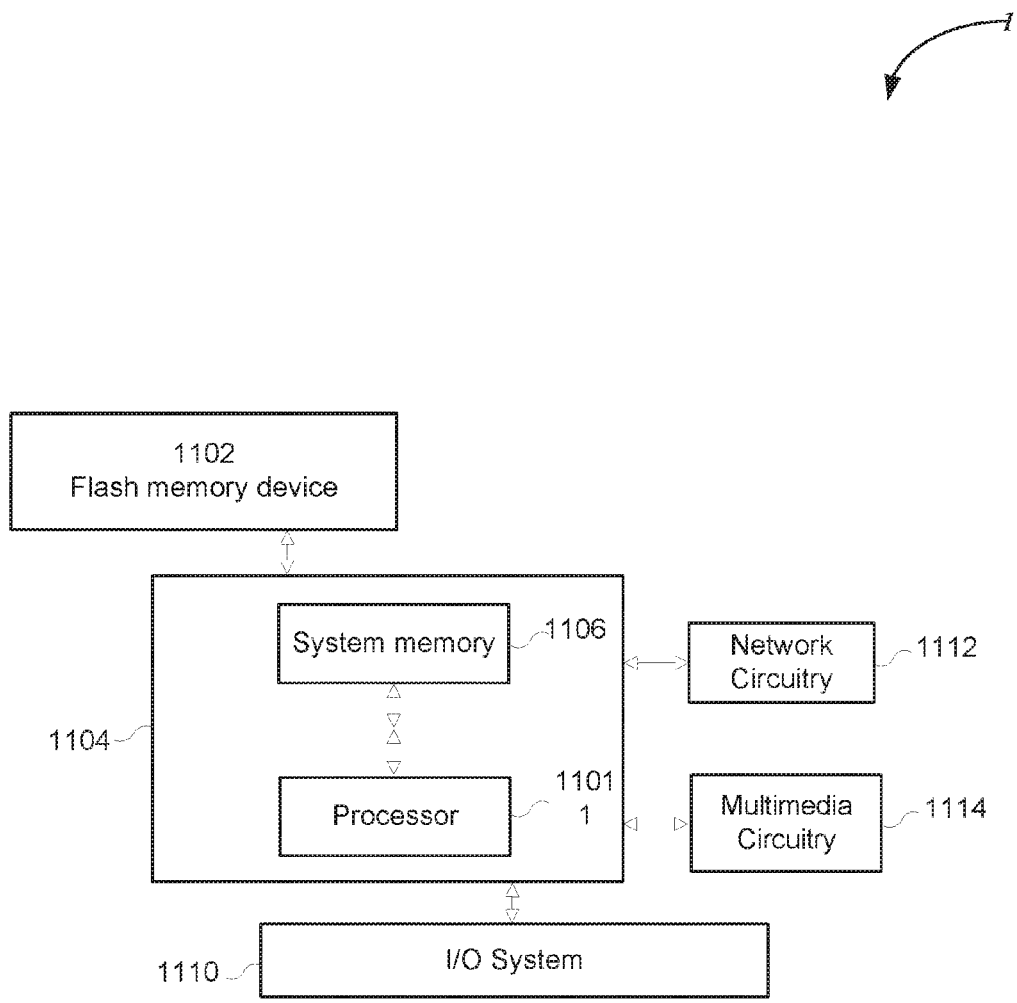
FIG. 11 is a simplified illustration of a computer device comprising an embodiment.

FIG. 10 is a flowchart illustrating process 1000 operating in a selected block, in a flash memory device for a 3-level memory cell, according to embodiments. Based on their disturb characteristics, the three bits in the three-level memory cell can be classified as a bit susceptible to most disturb, a bit susceptible to medium disturb, and a bit susceptible to least disturb. Accordingly, a selected block can be divided into three types of pages: a 'worst-disturbed page' comprising each bit of the three-level cell that is susceptible to most disturb, a 'medium-disturbed page' comprising each bit of the three level cell that is susceptible to medium disturb, and a 'least disturbed page' comprising each bit of the three level cell that is susceptible to least disturb.

At step 1010, process 1000 includes checking whether the selected block has all worst-disturbed pages reclaimed. Such a check can be performed in various ways. For example, an indicator bit in the Flash Translation Layer (FTL) can indicate whether the selected block is a block with all worst-disturbed pages reclaimed. In some embodiments, information regarding whether a sub-block has been reclaimed is stored in a meta data page in the flash memory.

If it is determined at step 1010 that the selected block does not have its worst-disturbed pages reclaimed, at step 1020, process 1000 includes determining one or more errors of the worst-disturbed page of the most disturbed wordline. Continuing along the branch, at step 1030, process 1000 includes determining whether the error count in a most disturbed wordline is greater than the threshold error count for a worst-disturbed page. If the error count does not exceed the threshold, process 1000 can end.

If the error count of the most disturbed wordline exceeds the threshold value, at step 1040, process 1000 includes copying all valid worst-disturbed pages to another free block in the flash memory. At step 1050, process 1000 includes indicating that the selected block is a block with all worst-disturbed pages reclaimed. In some embodiments, process 1000 can end after step 1050. In other embodiments, process 1000 can continue to step 1060 after step 1050.

Turning back to process 1000 at step 1010, if it is determined at step 1010 that the selected block has all worst-disturbed pages reclaimed, at step 1055, process 1000 includes determining whether all medium-disturbed pages are reclaimed.

If it is determined at step 1055 that the selected block has all medium-disturbed pages reclaimed, at step 1060, process 1000 includes determining one or more errors of the medium-disturbed page of the most disturbed wordline. Continuing along the branch, at step 1070, process 1000 includes determining whether the error count exceeds the threshold for a medium-disturbed page. If the error count of the medium-disturbed page of the most disturbed wordline does not exceed the threshold value for a medium-disturbed page, process 1000 can end.

If the error count of the medium-disturbed page of the most disturbed wordline exceeds the threshold value, at step 1080, process 1000 includes copying all valid medium-disturbed pages to other blocks in the flash memory. At step 1090, process 1000 includes indicating that the selected block is a block with all medium-disturbed pages reclaimed. In some embodiments, process 1000 can end after step 1090. In other embodiments, process 1000 can continue to step 1092 after step 1090.

Turning back to process 1000 at step 1055, if it is determined at step 1055 that the selected block is a block with all medium-disturbed pages reclaimed, at step 1057, process 1000 includes determining whether the selected block is a block with all least disturbed pages reclaimed.

If it is determined at step 1057 that the selected memory block does not have all least disturbed pages reclaimed, at step 1092, process 1000 includes determining one or more errors of the least disturbed page of the most disturbed wordline. At step 1094, process 1000 includes determining whether the error count of the least disturbed page of the most disturbed wordline exceeds a threshold error count for a least disturbed page. If the errors of the least disturbed page of the most disturbed wordline do not exceed the threshold value for a least disturbed page, process 1000 can end.

If the errors of the least disturbed page of the most disturbed wordline exceed the threshold value for a least disturbed page, at step 1096, process 1000 includes copying all valid least disturbed pages to other blocks in the flash memory.

At step 1098, process 1000 includes erasing the selected block and adding it to a free-blocks list.

Although processes 900 and 1000 was described above from the perspective of read disturb for a two-level and three-level cell respectively, without losing generality, the flow can be applicable for other error mechanisms. For example, based on their retention characteristics, the three bits in the three-level memory cell can be classified as a bit susceptible to most retention loss, a bit susceptible to medium retention loss, and a bit susceptible to least retention loss. Accordingly, a selected block can be divided into three types of pages: a 'worst-retention page' comprising each bit of the three-level cell that is susceptible to most retention loss, a 'medium-retention page' comprising each bit of the three level cell that is susceptible to medium retention loss, and a 'least retention page' comprising each bit of the three level cell that is susceptible to least retention loss. In examples, the type of pages that contain the read reference voltage between highest two programmed (such as a P6 and P7) states can be a worst-retention page. Similarly, in process 900, LSB and MSB page of 2-bit MLC page can be classified into worst-retention pages and least retention pages. In some embodiments, an LSB page can be a least retention page and MSB page can be worst-retention page. The flow of 3-bit and 2-bit for retention loss reclaim can be is similar to the flows for read disturb reclaim.

In some embodiments, the Garbage Collection (GC) process can be modified to better adapt to the methods, processes, and systems described in the specification. When a block is partially recycled, for example when the first sub-block of a memory block has been reclaimed but the second sub-block has not been reclaimed, only half or less than half the data in the memory block is valid. If the GC procedure does not account for this, the GC procedure may recycle such a partial block soon after half of its data is copied, leading to inefficiencies. To avoid this case, the GC procedure can maintain two pools of used blocks: one for normal blocks and the other for partially recycled blocks, which have been recycled because of read disturb reclaim or retention loss.

In examples, such a GC procedure searches for blocks in the normal pool and finds a block with minimum (or close to minimum) valid data. If the valid data in the normal pool is larger than a certain threshold for normal blocks, the GC procedure can turn to the partially recycled pool to find a partially recycled block with minimum (or close to minimum) valid data. Then, GC process can recycle a partially recycled block. Otherwise, the GC process can recycle the block in normal pool.

Methods and systems described in the disclosure present a number of features and advantages. In one embodiment, the error rate variation of the read disturb of LSB/MSB of 2-bit MLC flash and LSB/CSB/MSB of 3-bit TLC flash memory are leveraged. In some embodiments, partial data block recycle is carried out whereby only the worst page types that suffer from read disturb are copied/moved to thereby reduce the data copy by 50% and 67% for MLC and TLC respectively. This can significantly reduce effective write amplification. In another embodiment, the error rate variation of the retention of LSB/MSB of 2-bit MLC flash and LSB/CSB/MSB of 3-bit TLC flash memory are leveraged. Partial data block recycle is carried out whereby only the worst page types that suffer from retention are copied/moved to reduce the data copy by 50% and 67% for MLC and TLC respectively. This can also significantly reduce the effective write amplification. In other embodiments, mechanisms are devised that handle the partially recycled block under garbage collection policy. Thus, using the methodologies described herein, the write amplification can be reduced and the effective lifetime of flash-based SSD can be improved.

FIG. 11 illustrates an example computing device 1100 comprising embodiments of the invention. Hardware elements of device 1100 can be electrically coupled via a bus (or may otherwise be in communication, as appropriate). As shown in FIG. 11, computing device 1100 includes processing unit 1004, flash memory device 1002, an input/output (I/O) system 1110, network circuitry 1112, and multimedia circuitry 1114. In the example depicted, processing unit 1104 can act as a host system.

In examples, flash memory device 1102 can be a NAND flash memory device such as flash memory device 400 of FIG. 4, and can be used to store secondary data accessed by processing unit 1104. Flash memory device 1102 can include a flash memory controller (not shown) according to embodiments described above, acting as an interface between non-volatile memory device 1102 and the processing unit 1104. System memory 1106 can be a volatile memory such as a Random Access Memory (RAM) and can operate in conjunction with processor 1108. Processor 1108 can include, without limitation, one or more general-purpose processors and/or one or more special-purpose processors (such as digital signal processing chips, graphics acceleration processors, and/or the like).

Computing device 1100 can further include network circuitry 1112 to connect computing device 1100 to a network. The network circuitry can include without limitation a modem, a network card (wireless or wired), an infrared communication device, a wireless communication device and/or chipset (such as a Bluetooth™ device, an 1602.11 device, a WiFi device, a WiMax device, cellular communication facilities, etc.), and/or the like. Network circuitry 1112 may permit data to be exchanged with a network, other devices, and/or any other devices described herein.

As shown in FIG. 11, computing device 1100 can include multimedia circuitry 1114. Multimedia circuitry 1114 can connect computing device 1100 to several external audio and video input and output, such as displays and speakers. I/O system 1110 can connect computing device 1100 to various input devices and mechanisms such as keyboards, mice, touchscreens, cameras, infra-red capture devices, and the like, and output devices and mechanisms such as a printer, a display unit, a haptic feedback device, and/or the like.

Computing device 1100 also can include software elements, located within system memory 1106 or in flash memory 1102, including device drivers, executable libraries, and/or other code, such as one or more application programs, which may include computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device such as flash memory controller 250 of FIG. 2) to perform one or more operations in accordance with the described methods, for example, any of the methods illustrated in FIGS. 6-10.

A set of these instructions and/or code might be stored on a computer-readable storage medium, such as within flash memory device 1102, or, in examples, within the flash memory controller in flash memory device 1102. In some cases, the storage medium might be incorporated within a device, such as device 1100 or flash memory device 1102. In other embodiments, the storage medium might be separate from a device (e.g., a removable medium, such as a compact disc), and/or provided in an installation package, such that the storage medium can be used to program, configure and/or adapt a general purpose computer with the instructions/code stored thereon. These instructions might take the form of executable code, which is executable by a device and/or might take the form of source and/or installable code, which, upon compilation and/or installation on a device (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A method, comprising:
classifying sub-blocks in memory blocks comprising multi-level cells into sub-block types according to error rates, a first sub-block type having a higher error rate than a second sub-block type;
in a memory block where all sub-blocks of the first sub-block types have been reclaimed, performing a reclaim operations only on sub-blocks of the second sub-block type; and
in a memory block where all sub-blocks of the first sub-block types have not been reclaimed, performing a reclaim operations on sub-blocks of the first sub-block type that have not been reclaimed;
wherein performing a reclaim operation on a sub-block comprises:
determining that a condition associated with the sub-block is satisfied;
copying data associated with the sub-block to a second memory block different from a first memory block based on the determination that the condition associated with the sub-block is satisfied.

2. The method of claim 1, wherein the determining that the condition associated with the sub-block is satisfied comprises:
determining one or more errors associated with the sub-block; and
determining that the one or more errors associated with the sub-block exceed a threshold value.

3. The method of claim 2, wherein the one or more errors are caused by a read disturb.

4. The method of claim 2 wherein the one or more errors are caused by a loss of data retention.

5. The method of claim 1, wherein the determining that the condition associated with the first sub-block is satisfied comprises:
determining a number of reads associated with the first sub-block type.

6. The method of claim 1 further comprising:
storing an indicator associated with the first memory block, wherein the indicator indicates that the data associated with the first sub-block of the first memory block has been copied to a different memory block.

7. The method of claim 1 further comprising:
determining that a condition associated with sub-blocks of the second sub-block type is satisfied;
copying data associated with the second sub-block type to a third memory block based on the determination that the condition associated with the second sub-block is satisfied.

8. The method of claim 7, wherein the second memory block is the same as the third memory block.

9. The method of claim 7, wherein the second memory block is different from the third memory block.

10. The method of claim 1, wherein the first memory block further comprises a third sub-block type, the third sub-block representing a third bit of each of the plurality of N-bit cells.

11. A flash memory device comprising:
a flash memory, comprising:
a first memory block comprising a plurality of N-bit cells, wherein N is an integer;
a circuit comprising processing logic coupled to the flash memory and configured to classify sub-blocks in the first memory block into at least a first sub-block type and a second sub-block type, the first sub-block type having a higher error rate than the second sub-block type, the first sub-block type representing a first bit of each of the plurality of N-bit cells, and the second sub-block type representing a second bit of each of the plurality of N-bit cells;
the circuit further configured to perform a reclaim operation of the first memory block, wherein the circuit is configured to:
determine that all sub-blocks of the first sub-block type have been reclaimed;
perform a reclaim operation on sub-blocks of the second sub-block type using a second error count threshold, upon a determination that all sub-blocks of the first sub-block type have been reclaimed; and
perform a reclaim operation on sub-blocks of the first sub-block type using a first error count threshold, upon a determination that that not all sub-blocks of the first sub-block type have been reclaimed;
wherein, to perform a reclaim operation on a sub-block, the circuit is configured to:
determine that a condition associated with the sub-block is satisfied;
copy data associated with the sub-block to a second memory block different from a first memory block based on the determination that the condition associated with the sub-block is satisfied.

12. The flash memory device of claim 11, wherein the determining that the condition associated with the sub-block is satisfied comprises:
determining one or more errors associated with the sub-block;
determining that the one or more errors associated with the sub-block exceed a threshold value.

13. The flash memory device of claim 12 wherein the one or more errors are caused by a read disturb.

14. The flash memory device of claim 12 wherein the one or more errors are caused by a loss of data retention.

15. The flash memory device of claim 11, wherein the determining that the condition associated with the sub-block is satisfied comprises:
determining a number of reads associated with the sub-block.

16. The flash memory device of claim 11, wherein the circuit is further configured to:
store an indicator associated with the first memory block, wherein the indicator indicates that the data associated with the first sub-block of the first memory block has been reclaimed.

17. The flash memory device of claim 11, wherein the circuit is further configured to:
determine that a condition associated with sub-blocks of the second sub-block type is satisfied;
copy data associated with the second sub-block type to a third memory block based on the determination that the condition associated with the second sub-block is satisfied.

18. The flash memory device of claim 17, wherein the second memory block is the same as the third memory block.

19. The flash memory device of claim 17, wherein the second memory block is different from the third memory block.

20. The flash memory device of claim 11, wherein the first memory block further comprises a third sub-block type, the third sub-block representing a third bit of each of the plurality of N-bit cells.

21. A non-transitory computer readable medium having stored thereon instructions that, when executed by a processor, perform a method, including:
- classifying sub-blocks in memory blocks comprising multi-level cells into sub-block types according to error rates, a first sub-block type having a higher error rate than a second sub-block type;
- in a memory block where all sub-blocks of the first sub-block type; have been reclaimed, performing a reclaim operations only on sub-blocks of the second sub-block type; and
- in a memory block where all sub-blocks of the first sub-block types have not been reclaimed, performing a reclaim operations on sub-blocks of the first sub-block type that have not been reclaimed;
- wherein performing a reclaim operation on a sub-block comprises:
- determining that a condition associated with the sub-block is satisfied;
  - copying data associated with the sub-block to a second memory block different from a first memory block based on the determination that the condition associated with the sub-block is satisfied.

* * * * *